United States Patent [19]

Kataoka

[11] Patent Number: 4,549,077

[45] Date of Patent: Oct. 22, 1985

[54] SLIP PROCESSING SYSTEM

[75] Inventor: Kiroyuki Kataoka, Kanagawa, Japan

[73] Assignee: Fuji Xerox Co., Ltd., Tokyo, Japan

[21] Appl. No.: 437,395

[22] Filed: Oct. 28, 1982

[30] Foreign Application Priority Data

Oct. 30, 1981 [JP] Japan .................................. 56-172889

[51] Int. Cl.⁴ ............................................. G07B 15/02
[52] U.S. Cl. .................................... 235/384; 235/454; 354/6; 355/14 C
[58] Field of Search ................. 364/523; 355/7, 14 C; 40/2 R; 354/6, 7; 235/454, 384

[56] References Cited

U.S. PATENT DOCUMENTS

| 3,626,824 | 12/1971 | Kolb et al. ............................... 354/6 |
| 4,013,876 | 3/1977 | Anstin . |
| 4,167,324 | 9/1979 | Wu ....................................... 355/7 X |
| 4,205,780 | 6/1980 | Burns et al. . |
| 4,214,276 | 7/1980 | Pugsley et al. ....................... 354/7 X |
| 4,273,440 | 6/1981 | Froessl . |
| 4,303,948 | 12/1981 | Arai et al. . |
| 4,322,157 | 3/1982 | Miura et al. ....................... 355/14 C |
| 4,459,611 | 7/1984 | Arai et al. . |

FOREIGN PATENT DOCUMENTS 2318034 2/1977 France .

Primary Examiner—David L. Trafton
Attorney, Agent, or Firm—Sughrue, Mion, Zinn, Macpeak & Seas

[57] ABSTRACT

A slip processing system operates to read necessary data from a separate sheet or sheets, and identifies, from the data read, certain letters or numerals that characterize the slip to be prepared. The apparatus includes a device selecting a predetermined visual mark or mode according to the results of identification, a memory storing the image of the data read, an editing device for allocating the stored data and selected mark or mode to respective locations on predetermined slip forms, and a printer for printing the edited data onto a prescribed slip sheet.

10 Claims, 9 Drawing Figures

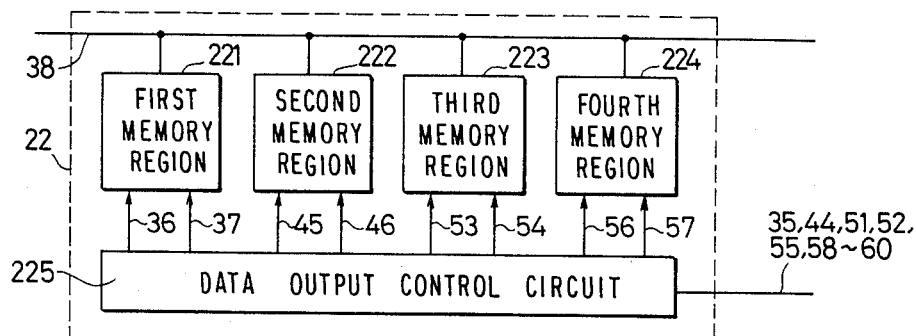

SLIP PROCESSING SYSTEM

FIELD OF THE INVENTION

The present invention relates to a processing system for preparing slips, i.e., shipping or handling slips using data noted on a separate sheet.

BACKGROUND OF THE INVENTION

Clerks employed at a department store, for example, must make shipping slips for goods requested by customers to be shipped. A set of shipping slips consists of a number of associated slips such as (1) a handling slip necessary for locating and packaging goods at a shipping center, (2) a tag to be attached to the goods, (3) a handling slip necessary for services at a depot (e.g., a small delivery station) connecting the shipping center and the addressee, and (4) a slip (delivery receipt) to be signed by the addressee acknowledging the receipt of the goods. Therefore, whenever required by a customer a shipping clerk prepares a set of such shipping slips according to information regarding the goods, the sender and addressee.

FIG. 1 illustrates a conventional handling slip 1 containing an "Addressee" section 11 and a "Sender" section 12. In the "Addressee" section, the name and address of the addressee, the name of the goods and a symbol indicative thereof are to be noted, and in the "Sender" section, the name and address of the sender are to be written. The information contained in the other shipping slips is basically the same as that noted in the handling ship.

Department stores get extraordinarily busy several times a year, but especially in December and January, when people buy and exchange gifts. At these peaks, shipping clerks have to read the slips quickly and accurately to select the proper way to ship the goods. For instance, the handling slip 1 shown in FIG. 1 indicates that the packaged goods contain fish, so the clerk, recognizing this by the name or symbol, selects the proper way to ship the same. Writing alone often fails to enable the clerk to identify the goods quickly. Of course, goods may be indicated by numerals as shown in FIG. 1, but it is very diffiuclt for clerks to completely memorize which numeral is keyed to what goods and instantly identify the goods being handled.

SUMMARY OF THE INVENTION

Therefore, one object of the present invention is to provide a slip processing system capable of preparing slips permitting an operator to immediately recognize the identity of the goods. This object can be achieved by a system including means for recognizing letters or numerals which are characteristic of the goods and which are noted on a separate sheet, and means for selecting a visual mode according to the recognition result and printing said mode on a slip.

BRIEF DESCRIPTION OF THE DRAWINGS

FIG. 5 is a block diagram of the data memory unit of FIG. 3;

FIG. 6 is a plan view showing how an order slip is filled in;

FIG. 9 is a plan view of another set of shipping slips prepared by the system of FIG. 2 and stacked one on another, together with an enlarged view of the top slip.

DETAILED DESCRIPTION OF THE INVENTION

Figure 1:
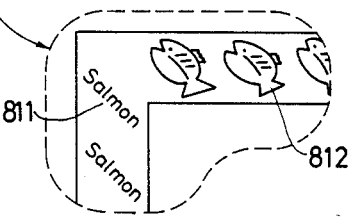
FIG. 1 is a plan view of a conventional handling slip.
Figure 2:
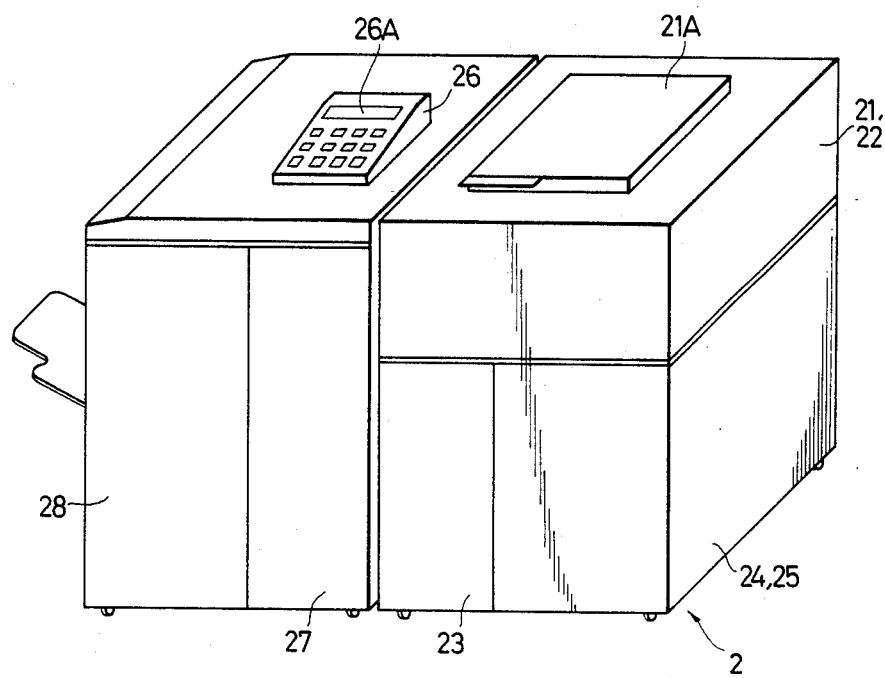
FIG. 2 is a general view of the slip processing system according to one embodiment of the present invention.
Figure 3:
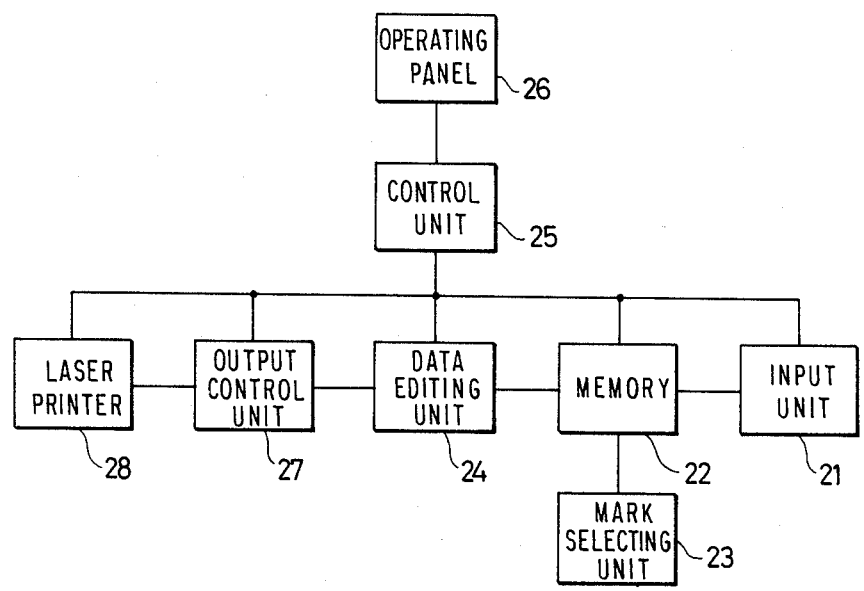
FIG. 3 is a block diagram showing the essential parts of this system.

FIG. 2 is a general view of the slip processing system according to one embodiment of the present invention. The system generally indicated at 2 consists of two physically separate portions: the right-hand portion consists of a data input unit 21 with a platen 21A on the top, a memory unit 22 for storing the input data, a mark selecting unit 23 that identifies the goods according to the stored data and selects a proper mark, a data editing unit 24, and a control unit 25. The left-hand portion consists of an operating panel 26, an output control unit 27 and a printing unit 28 for delivering output data using a laser beam. The respective units are electrically connected as shown in the block diagram of FIG. 3.

Figure 4:
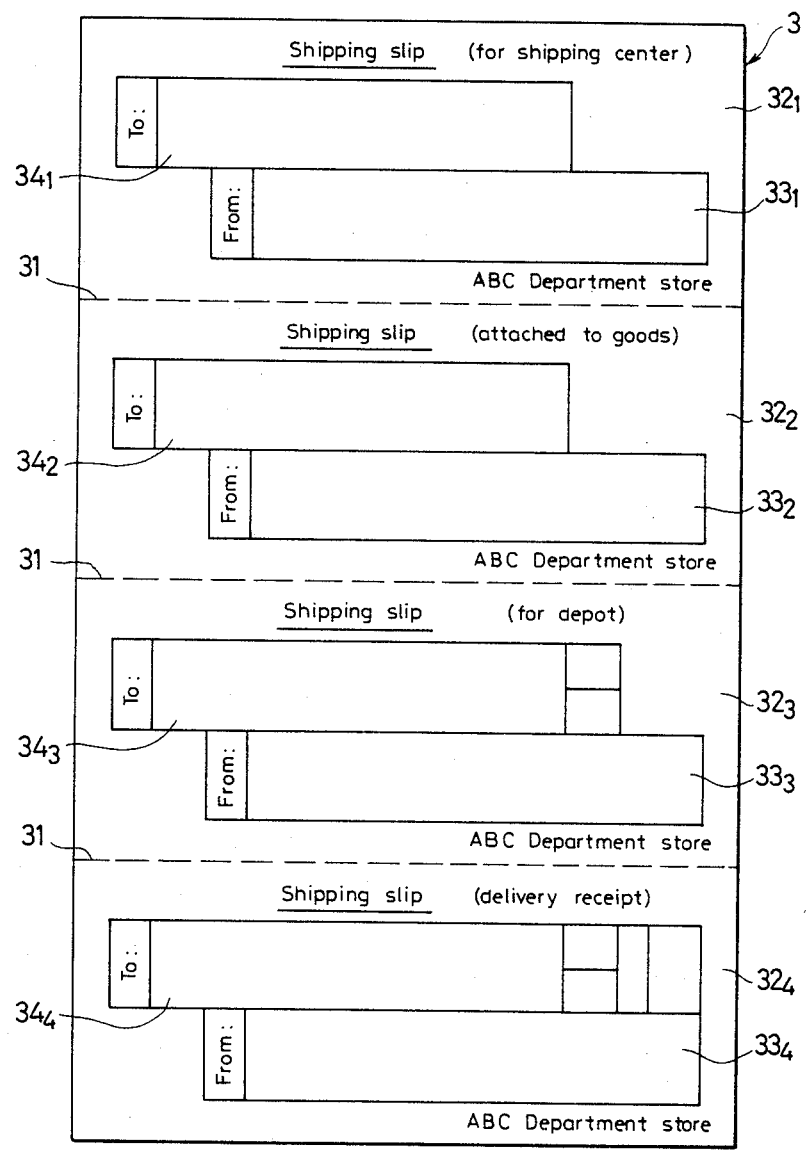
FIG. 4 is a plan view of a form containing a set of four shipping slips.

The system of FIG. 2 prepares slips according to a set of standardized forms in a sequence of four steps. The first step is to store the data regarding the prescribed slip form. FIG. 4 is a plan view of a form containing a set of four shipping slips as widely used in the shipping section of department stores. The form of shipping slips 3 processed by the system of the present invention must meet the following requirements:

(1) It must contain several associated forms or slips that are prepared according to a single set of information. In the case of shipping slips, four forms are necessary:
  (i) a handling slip for use at a shipping center,
  (ii) a tag to be attached to the goods,
  (iii) a handling slip for use at a depot, and
  (iv) a delivery receipt.

The system of the present invention prepares these slips on a single sheet of paper, so that the form 3 consists of four forms $32_1$ to $32_4$ connected to each other by a tear line 31.

(2) The four forms $32_1$ to $32_4$ are preferably arranged in the same order as the prepared slips will be used. The slips issued from the system are successively torn apart on the lines 31, so by arranging the four forms in the correct order, the use of a stapler to bind the four together can be avoided.

(3) The "sender" sections $33_1$ to $33_4$ of the respective forms $32_1$ to $32_4$ must be of the same size. As will be described later, this is because the processing system must electrically read the name and address of the sender written in the prescribed section of the order form, and "patch" the "sender" sections on the respective slips. The "addressee" sections $34_1$ to $34_4$ need not be of the same size as each other, but to facilitate processing in the memory unit, the size of each "addressee" section is preferably the same.

A sheet of paper including the slip forms meeting the above requirements is first set on the platen 21A. When the operator depresses a form storing switch on the operating panel 26, the control unit 25 sends a read command signal to the input unit 21, which then causes a fluorescent lamp (not shown) under platen 21A to move in an auxiliary scanning direction, so as to read the form 3 whose image is then formed on an image sensor (not shown). The resulting video signal is digitalized and sent to the memory unit 22.

FIG. 5 is a block diagram of the memory unit 22, which consists of first to fourth memory regions 221 to 224 and a data output control circuit 225. When the form storing switch is depressed to initiate the reading of form 3, control unit 25 furnishes control circuit 225 with a signal 35 that commands the storage of the form. Upon receiving this signal 35, control circuit 225 sends a read/write signal 36 to the first memory region 221, in which the digitalized video signal 38 is written as the image of the form 3 with the aid of an addressing signal 37.

When form 3 has been stored in the system, the second step may begin. The second step consists of loading the system with the information written on the order slip. FIG. 6 is a plan view of an order slip as filled in by the sender. Ihe order slip generally indicated at 4 contains, for example, ten sections $41_1$ to $41_{10}$ in which the names and addresses of respective addressees are written, and a section 42 in which the name and address of the sender are written. Sections $41_1$ to $41_{10}$ correspond to sections $34_1$ to $34_4$ shown in FIG. 4 and are of the same size, and section 42 corresponds to sections $33_1$ to $33_4$ of FIG. 4 and is also the same size. Order slip 4 is set on the platen 21A. When the operator depresses the data storage switch on the operating panel 26, control unit 25 sends a read start signal to data input unit 21, whereupon the information is read from the order slip as described in connection with the first step.

When the reading of the order slip 4 has started, control unit 25 provides I/O control circuit 225 with a signal 44 for instructing the storage of that slip. Upon receiving this signal 44, control circuit 225 sends a read/write signal 45 to the second memory region 222, in which a digitalized video signal 38 is written as the image of the slip 4 with the aid of an addressing signal 46.

When the information on the order slip has been stored in the system, the third step begins, which consists of the recognition of the numerals indicated in "Item Symbol" sections $47_1$ to $47_{10}$ on the order slip and the selection of the proper item (goods identifying mark). The positions of each of the sections $47_1$ to $47_{10}$ on the order slip 4 are predetermined, so that when a read-out signal 51 is delivered to control circuit 225 from control unit 25, a read/write signal 45 is produced and video signals 38 for the respective positions are produced in response to an addressing signal 46. These video signals are successively fed to mark selecting unit 23.

Mark selecting unit 23 functions as an optical character reader (OCR) and analyzes and identifies the numerals written in sections $47_1$ to $47_{10}$. It then reads a corresponding mark out of an internal memory and sends this mark to data storage unit 22 together with a signal 52 that specifies the proper "symbol" selection. Upon receiving the signal 52, control circuit 225 sends a read/write signal 53 to the third storage region 223, in which digitalized video signals corresponding to the marks are written with the aid of addressing signals 54 for the respective sections $47_1$ to $47_{10}$.

Figure 7:
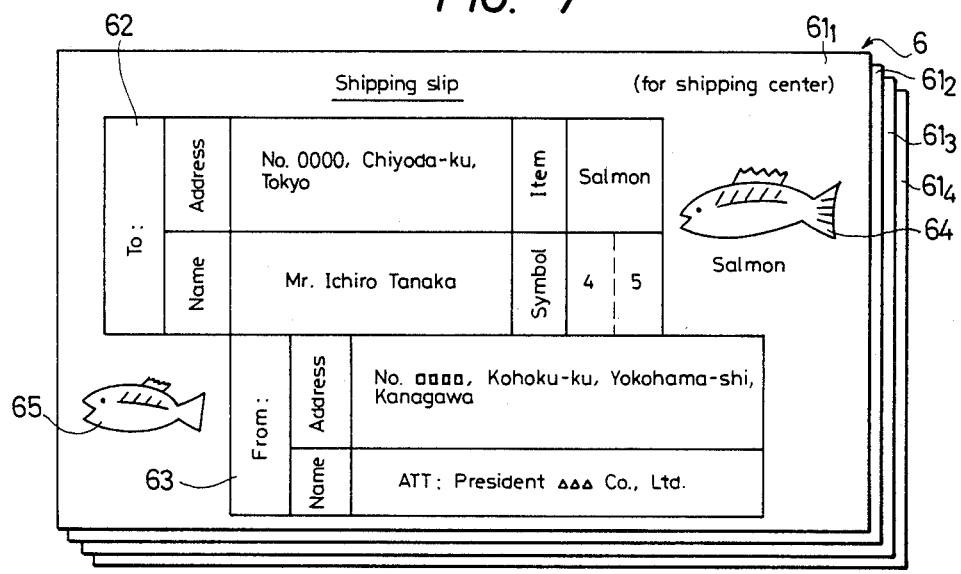
FIGS. 7 and 8 are plan views of two different sets of shipping slips prepared by the system of FIG. 2 and stacked on on another.

When all marks have been written in the third storage region 223, the system is ready to perform the fourth step, which consists of electronically editing the data stored in the first to third storage regions 221 to 223 and issuing the desired shipping slips. FIG. 7 shows such issued slips in discrete form. The set of shipping slips 6 consists of a handling slip $61_1$ for use at a shipping center, a tag $61_2$ to be attached to the goods, a slip $61_3$ for use at a depot and a delivery receipt $61_4$. The necessary data has been electronically loaded from the order slip 4 (FIG. 6), and the "addressee" section 62 and "sender" section 63 on each of the slips $61_1$ to $61_4$. Before starting the fourth step, the operator selects the proper operating mode according to the information displayed on display unit 26A of operating panel 26 (FIG. 2). Typical operating modes include (i) setting the number of copies to be made, (ii) setting the number of cases to be handled and (iii) setting the proper form to be used. In (i), the number of sets of slips 6 to be issued is determined. One set of slips is sufficient for ordinary cases, but if copies are necessary, mode (i) is selected and the number of copies to be made is set. If the number of necessary copies is so set, a counter (not shown) in output control unit 27 is set to cause printer unit 28 to print out the required number of copies. In (ii), the number of the "addressee" sections in the order slip 4 is set. The order slip shown in FIG. 6 contains ten such sections. When the number of such sections is set, a counter (not shown) in editing section 24 is set and as many shipping slips as are equal to the set number are prepared. In (iii), forms other than those for shipping slips (FIG. 4) which are used by a specific department store may be stored in the first storage region 221 as required.

After setting the proper operating mode, the operator depresses a slip issue button on operating panel 26. Then, data editing unit 24 produces a signal for transmitting the form that has been stored in the first storage region 221 to the fourth storage region 224. When signal 55 containing the address information for such transmission is supplied to I/O control circuit 225, a read/write signal 36 is sent to the first storage region 221, which is also provided with an addressing signal 37 that designates the stored address of form 3. A video signal 38 is thus read out and is written into the fourth storage region 224 as the image of form 3, with the aid of read/write signal 56 and addressing signal 57.

Subsequently, data editing unit 24, under the control of control unit 25, produces a signal 58 for transmitting part of the data stored in the second storage region 222 over to the fourth storage region 224. At this stage, the signal 58 supplied to the I/O control circuit 225 contains address information that designates the reading position of the first "addressee" section $41_1$ (FIG. 6) and address information designating the writing position of each "addressee" section 62 (FIG. 7). These two types of information have already been stored in a memory (not shown) in the editing unit 24 using keys on the operating panel 26.

When signal 58 is fed to I/O control circuit 225, read/write signal 45 is sent to the second storage region 222 along with an addressing signal 46 that designates the address at which the data written in first "addressee" section $41_1$ has been stored. A video signal 38 is thus read out and is first written in the location corresponding to each "addressee" section 62 (FIG. 7) in the fourth storage region 224 according to the read/write signal 56 and the addressing signal 57 for the "addressee" section of slip $61_1$. In the same manner, the "addressee" sections in slips $61_2$ to $61_4$ are successively designated by addressing signal 57, and the video signal read out from the location in the second storage region 222 corresponding to the first "addressee" section 41₁ is written in the corresponding location in each of the slips 61₂ to 61₄.

When the necessary information has been "transcribed" from the first "addressee" section 41₁, data editing unit 24 produces a signal 58 that includes address information for designating the reading position of "sender" section 42 (FIG. 6) and address information designating the writing position of "sender" section 63 (FIG. 7). These two types of address information have also been stored in the memory in the editing unit 24. When signal 58 is fed to I/O control circuit 225, the data regarding the sender is transcribed onto the location corresponding to the "sender" section 63 of each of the slips 61₁ to 61₄ in the same manner as described above.

When the above transcription sequence has been completed, data editing unit 24 produces a signal 59 for transmitting part of the data in the third storage region 223 to the fourth storage region. Signal 59 contains address information for designating the reading position of the mark corresponding to the first "symbol" section 47₁ (FIG. 6) and address information for designating the position at which the mark is to be placed on each of the slips 61₁ to 61₄ (FIG. 7). When the signal 59 is supplied to I/O control circuit 225, a read/write signal 53 is sent to the third storage region 223 andthe stored mark address for the first "symbol" section 47₁ is designated by addressing signal 54. A video signal 38 is thus read out and is written into the fourth storage region 224 in specific positions designated by the read/write signal 56 and addressing signal 57 which instructs writing, in this case, onto the upper right corner and lower left corner of the slip 61₁. In the present case, it is assumed that the packaged goods are fish, and salmon in particular. Since the upper right corner of the slip 61₁ is larger than the lower left corner, data corresponding to a mark 64 representing a fish and a symbol or printed characters for salmon is written into the location corresponding to the upper right corner, whereas data corresponding to another mark 65 also representing a fish may be written into the location corresponding to the lower left corner. In the same manner, the other slips 61₂ to 61₄ are addressed sequentially by the addressing signal 57, and a video signal 38 is written into the addressed locations. The present sheet of shipping slip forms 3 (FIG. 4) is of such a nature that neither depot slip 61₃ nor delivery receipt 61₄ has an adequate space in the upper right corner. Therefore, in this case data corresponding to mark 65 is written only into the location corresponding to the lower left corner of each of these slips.

After the data editing unit 24 has completed the above sequence, control unit 24 instructs output control unit 27 to begin to issue the slips, whereupon it produces a signal 60 instructing the delivery of the image synthesized in the fourth storage region 224. Upon receiving signal 60, I/O control circuit 225 outputs a read/write signal 56 and an addressing signal 57 to produce an output video signal 38 from the fourth storage region 224. This video signal is then fed to the printer unit 28, which prints out shipping slips 6 in a digital fashion. Thereafter, the system performs the next shipping slip issuing cycle according to the same sequence.

Figure 8:
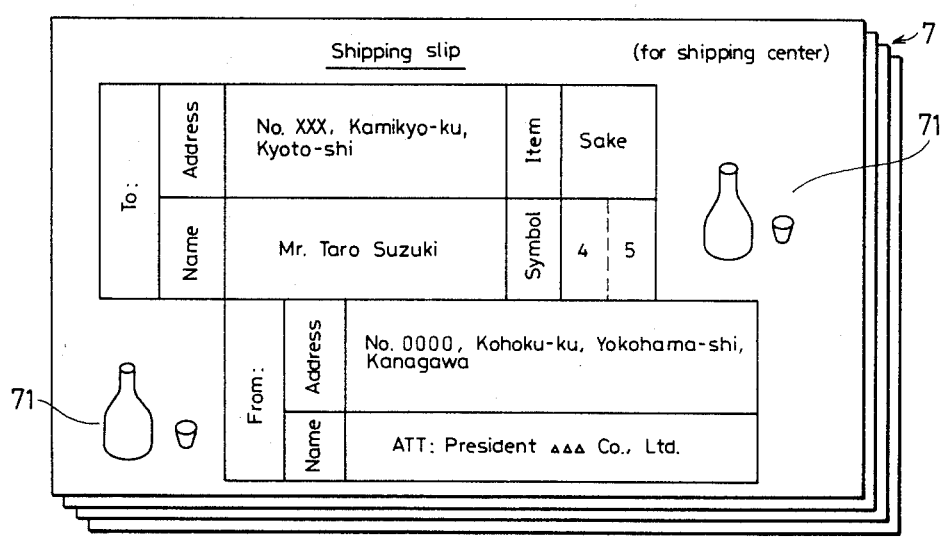

FIG. 8 illustrates a set of shipping slips 7 which have been issued from the system of the present invention together with a mark 71 representing alcoholic beverages. Since mark 71 does not contain letters and is of a relatively small size, it can be written in both the upper right and lower left corners of each slip.

FIG. 9 shows another embodiment of the present invention wherein a set of shipping slips generally indicated at 8 is made to contain the item mark in a small space defined by ruled lines 81. As shown in the enlarged scale portion, the item mark consists of the name 811 "salmon" and a picture 812 of a fish (which is the generic description). One advantage of the embodiment of FIG. 9 is that it is capable of enabling the operator to identify the goods instantly by using only a tiny mark.

As described in the foregoing, the system of the present invention prints out descriptive information and a mark designating the goods simultaneously, and is capable of preparing slips with a good visual effect in a very efficient manner. In the embodiments described above, Addressee, Sender and Mark data is written into the fourth storage region 224 in the stated order, but it is to be understood that the respective data can be written in other orders. In the above embodiments, the slip processing system both reads out slip forms and stores the resulting video signal in an internal memory, but it will also be understood that an external memory such as a floppy disc may be used to store the necessary slip forms.

What is claimed is:

1. A slip processing system, comprising; means for reading necessary data from separate sheets, means for identifying, from the data read, certain letters or numerals that characterize a slip to be prepared, means for selecting a predetermined visual mark according to the results of said identification, means for storing the image of the data read, editing means for allocating the stored data and selected mark into locations on predetermined slip forms, and means for printing the edited data onto a prescribed slip sheet.

2. A system as claimed in claim 1, wherein said separate sheets include a blank form of said prescribed slip sheet.

3. A system as claimed in claim 1, said characterizing letters or numerals comprising code characters, said identifying means matching said code characters with a predetermined visual mark, and outputting said visual mark, as digital data, to said image storing means.

4. A system as claimed in claim 1, said storing means comprising memory means for storing image data pertaining to a blank form, and descriptive data pertaining to a data source slip.

5. A system as claimed in claim 4, said memory means comprising a plurality of memory regions for respectively storing said blank form data, said descriptive data, said predetermined visual mark, and data synthesized by combining data from the outer memory regions.

6. A system as claimed in claim 5, said editing means comprising means for selecting and combining data from that stored in said blank form data, descriptive data and visual mark memory regions, said data being combined in said synthesized data region.

7. A system as claimed in claim 1, said slip comprising a plurality of said predetermined slip forms, said storing means containing digital data representing an image of said slip forms, one of said separate sheets comprising a descriptive data sheet, said editing means selecting data from said descriptive data sheet for allocation onto said slip forms.

8. A system as claimed in claim 7, said storing means further containing digital data representative of said visual mark, said editing means allocating said visual mark data onto a preselected portion of said slip forms.

9. A system for preparing printed slips, said system comprising a device (21) for reading information from a plurality of sheets (4) in sequence, a digital memory (22) for storing informtion read by said device (21), a control circuit (25, 225) for controlling locations in said memory (22) occupied by said information, and a printing device (28) for reproducing the data in said memory (22), said system including a character recognition device (23) responsive to signals from said reading device (21), said signals indicating indicia ($47$–$47_{10}$) on said sheets (4), said recognition device (23) generating signals corresponding to said indicia ($47$–$47_{10}$), said memory (22) including a first store (221) for digital data indicative of a desired form to be printed, a second store (222) for data to be printed in said form, a third store (223) for image data (64, 65, 71) corresponding to said indicia ($47$–$47_{10}$), said third store (223) being responsive to signals from said recognition device (23), and a fourth store (224) for sequentially receiving and storing data from said first, second and third stores (221-223).

10. A system as claimed in claim 1, including an editing device (24) for storing and sequentially supplying address information (55, 58, 59) indicating locations of data in said first, second and third stores (221,-223) and the required locations in said fourth store (224) to which said data is to be transferred.

* * * * *